United States Patent

[11] 3,587,408

| [72] | Inventors | Elmer A. Haase;<br>James M. Kirwin, South Bend, Ind. |
|---|---|---|
| [21] | Appl. No. | 828,178 |
| [22] | Filed | May 27, 1969 |
| [45] | Patented | June 28, 1971 |

[54] DIAPHRAGM-TYPE FLUID SEAL
6 Claims, 5 Drawing Figs.

[52] U.S. Cl. ............................................... 92/89,
251/61.2, 92/168
[51] Int. Cl. ...................................................... F01b 19/00
[50] Field of Search ........................................... 92/98, 99,
100, 168; 91/369, 369 (A), 369 (B); 74/18.1, 18.2

[56] References Cited
UNITED STATES PATENTS

| 957,347 | 5/1910 | Kennedy ........................ | 74/18.2X |
| 2,202,351 | 5/1940 | Loweke ........................ | 74/18.2X |
| 2,807,239 | 9/1957 | Grant ........................... | 91/369X |
| 3,110,031 | 11/1963 | Price ............................. | 91/369X |
| 3,303,852 | 2/1967 | Miller ........................... | 74/18.1X |
| 3,410,178 | 11/1968 | Kytta ............................ | 91/369 |
| 3,452,646 | 7/1969 | Abbott et al. .................. | 91/369 |

*Primary Examiner*—Edgar W. Geoghegan
*Assistant Examiner*—L. J. Payne
*Attorneys*—Gordon H. Chenez and Plante, Arens, Hartz, Hix and Smith ABSTRACT: A diaphragm-type fluid seal adapted for use with a push rod exposed to pressurized air and liquid fluids. A flexible diaphragm fixedly mounted at its radially outermost portion is provided with a central opening through which the push rod extends providing frictional engagement and thus a fluid seal between contacting surfaces of the diaphragm and rod thereby isolating the pressurized air and liquid. The diaphragm is flexible to the extent of axial movement of the rod to avoid relative movement between the diaphragm and rod in response to rod movement. An adjustable member threadedly carried by the rod and engageable with the centermost portion of the diaphragm provides a way of easily and accurately positioning the diaphragm relative to the rod to eliminate undesirable spring rate effect of the diaphragm on the rod.

DIAPHRAGM-TYPE FLUID SEAL

The present invention is an improvement of the fluid seal shown and described in U.S. Pat. No. 3,114,359 issued Dec. 17, 1963, in the name of E. A. Haase and having a common assignee.

BACKGROUND OF THE INVENTION

Fluid seals of various types are required in fluid-operated control mechanisms particularly of the hydromechanical and hydropneumatic types wherein a movable actuating member is exposed to two fluids of different pressures which fluids may be the same or one liquid and one pneumatic. In many situations, it is necessary to provide the actuating member with a fluid seal which permits movement of the actuating member as well as maintain a seal against fluid leakage due to the fluid pressure differential thereacross such as that shown and described in the above-mentioned U.S. Pat. No. 3,114,359. However, such fluid seals may not be entirely satisfactory from the standpoint of frictional drag imposed by the seal on the actuating member slidable relative thereto which, in turn, results in wear of the seal surfaces and premature failure of the seal. Assembly and disassembly problems are directly related to the complexity of the seal mechanism which complexity is reflected in proportionally higher manufacturing and maintenance expense. Also, it is desired to eliminate or minimize, at least, any extraneous force due to fluid pressure unbalance which may be exerted on the actuating member.

Furthermore, frictional drag and related forces imposed on actuating members which are to be accurately and consistently displaced as a function of relatively small control forces applied thereto have an adverse effect on the response of the actuating member and contribute to undesirable characteristics such as undue hysteresis, etc.

It is an object of the present invention to provide a flexible fluid seal having a fixed outermost portion and a relatively movable innermost portion frictionally engaged with a movable member and provided with adjustable means for varying the position of the innermost portion relative to the actuating member.

It is another object of the present invention to provide a diaphragm-type fluid seal adapted to frictionally engage a control member extending therethrough and further provide adjustable means for positioning the fluid seal relative to the control member.

DESCRIPTION OF THE PREFERRED EMBODIMENT

Figure 1:
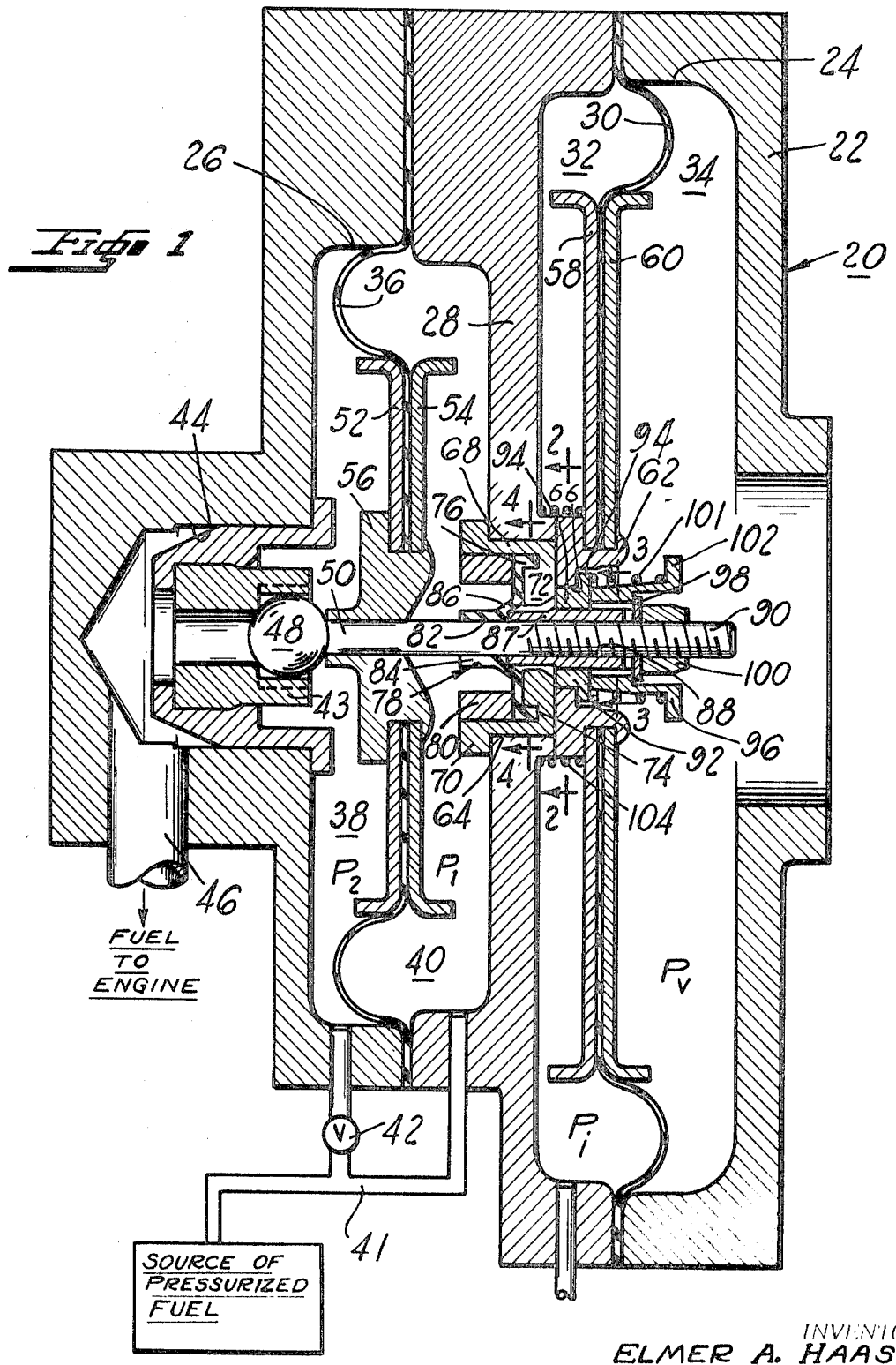
FIG. 1 represents a sectional view of control mechanism embodying the present invention.

Referring to the drawings and, in particular, FIG. 1, numeral 20 represents a portion of a fuel-metering unit shown and described in detail in the heretofore-mentioned U.S. Pat. No. 3,114,359 to which reference is made for specific details not necessary to fully understand the present invention. In general, the portion of the fuel-metering unit shown includes a multisection casing 22 having an air section 24 and a fuel section 26 separated by a wall 28.

The air section 24 includes a diaphragm 30 fixedly secured at its outermost portion to casing 22 and separating a chamber 32 from a chamber 34. Chambers 32 and 34 are vented to venturi throat air pressure $P_r$ and impact air pressure $P_i$, respectively, derived from a venturi, not shown.

The fuel section 26 includes a diaphragm 36 fixedly secured at its outermost portion to casing 22 and separating a chamber 38 from a chamber 40. Chambers 38 and 40 communicate with pressurized fuel at pressures $P_2$ and $P_1$, respectively, in a fuel conduit 41 supplying pressurized fuel to chamber 38. Fuel pressures $P_1$ and $P_2$ are derived from the upstream and downstream sides of a fuel-metering valve generally indicated by 42 disposed in conduit 41 thereby representing a fuel pressure differential $P_1-P_2$ which, for a given fuel-metering valve 42 area, determines the rate of metered fuel flow through conduit 41.

The chamber 38 is provided with a fuel outlet defined by an annular valve seat 43 fixedly secured in an opening 44 of casing 22 by any suitable means such as a press fit. The opening 44, in turn, discharges fuel to a passage 46 which feeds the fuel to an engine, not shown.

The effective flow area of the valve seat 43 is controlled by a ball-type valve 48 adapted to seat thereon. The ball valve 48 is fixedly secured to one end of an actuating member or rod 50 and is positioned relative to valve seat 42 in response to a force balance derived from diaphragms 30 and 36 as will be described. To that end, the fuel diaphragm 36 is provided with backing plates 52 and 54 which are clamped against opposite sides thereof by a retaining member 56 suitably upset or otherwise connected to provide a rigid assembly. The rod 50 is axially aligned with diaphragm 36 and extends through retaining member 56 fixedly thereto.

The air diaphragm 30 is provided with backing plates 58 and 60 clamped against opposite sides thereof by a retaining member 62 suitably upset or otherwise connected to provide a rigid assembly.

The rod extends through an opening 64 in wall 28 separating fuel and air chambers 40 and 32, respectively, and through a central hexagonal opening 66 in retaining member 62. A diaphragm retaining member 68 preferably made from a synthetic material such as the commercially available plastic sold under the trade name "Delrin" and manufactured by the E. I. DuPont de Nemours and Company is provided with a radially outwardly extending flange 70 and a radially inwardly extending flange 72 and is fixedly secured in opening 64 by any suitable means such as a press fit. An annular recess 74 formed in flange 72 is adapted to receive an annular lip 76 defined by the outermost portion of a diaphragm-type fluid seal 78. The lip 76 is trapped in annular recess 74 by a retaining ring 80, which like retaining member 68, is made of "Delrin." The retaining member 80 is fixedly secured in position relative to retaining member 68 as shown in FIG. 1 by suitable application of heat to fuse the retainer members 68 and 80 together.

Figure 5:
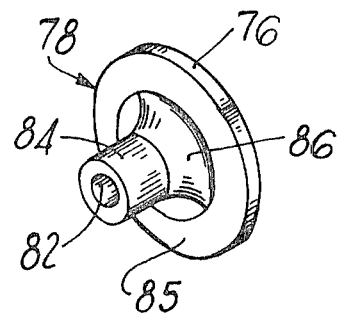
FIG. 5 represents a view of the diaphragm-type fluid seal shown removed from the remaining structure of FIG. 1.

The flexible diaphragm 78 is preferably molded from any suitable compound such as rubber, capable of withstanding the effects of fuel and suitably resilient to permit flexing thereof in response to movement of rod 50 which extends through a central opening 82 in diaphragm 78. The opening 82 is provided with an axially extending annular lip portion 84 somewhat smaller in internal diameter than rod 50 to provide frictional engagement therebetween. As shown in FIG. 5, the diaphragm is provided with an annular wall 85 extending radially inwardly from lip 76 and an angularly extending wall 86 connecting wall 85 with lip 84.

Figure 2:
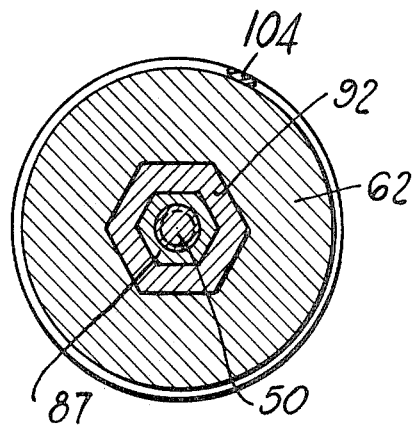
FIG. 2 represents a section taken on line 2-2 of FIG. 1.
Figure 3:
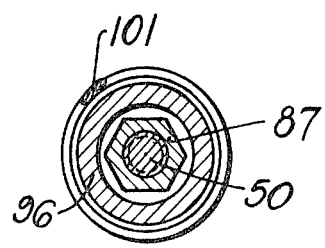
FIG. 3 represents a section view taken on line 3-3 of FIG. 1.
Figure 4:
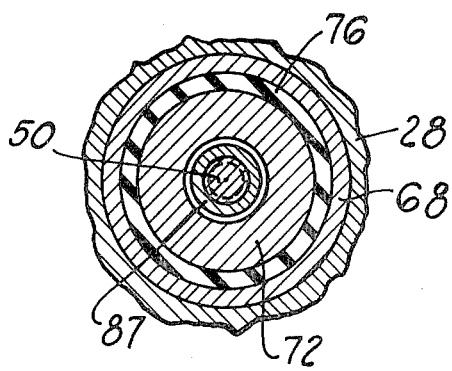
FIG. 4 represents a section view taken on line 4-4 of FIG. 1.

The position of lip portion 84 relative to rod 50 may be varied for calibration purposes by an adjustable hexagonal sleeve 87 threaded internally as at 88 and adapted to bear against lip portion 84. The rod 50 is provided with a screw thread 90 and is threadedly engaged by sleeve 87 which sleeve when turned advances axially along rod 50 to a desired position as will be described. The sleeve 87 is locked in position rotationally by a retaining ring 92 having a hexagonal cross-sectional area as shown in FIG. 2 and provided with a flange 94 extending outwardly therefrom. The retaining ring 92 is adapted to slide without interference over sleeve 87 and into hexagonal opening 66 of retaining member 62 to thereby fix the relative positions of sleeve 87, retaining ring 92 and retaining member 62. An annular spacing member 96, having an internal diameter large enough to permit member 96 to slide without interference over hexagonal sleeve 87, is adapted to abut retaining ring 92. The internal diameter of spacing member 96 is enlarged over a portion thereof to receive a washer 98. A nut 100 threadedly engaged with rod 50 bears against washer 98. A compression spring 101 interposed between retaining ring 92 and a flange 102 of spacing member 96 tends to urge the same apart.

A compression spring 104 interposed between wall 28 and backing plate 58 serves to preload diaphragm 30.

OPERATION

In assembling the above-described apparatus, the retaining member 68, diaphragm 78 and retaining ring 80 are first secured to wall 28 as shown in FIG. 1. The diaphragm 30 as well as diaphragm 36 with attached ball valve 48 and rod 50 are then clamped in position between adjacent portions of casing 22 by suitable conventional fastening means, not shown. The diaphragm 78 slidably receives rod 50 which by virtue of the frictional engagement therebetween tends to stretch the diaphragm 78 beyond the limit of its normal flexible range which diaphragm being relatively small in diameter, has relatively large spring rate effect and imposes an undesirable force load on rod 50 tending to seat ball valve 48.

The sleeve 87 is threaded on rod 50 and adjusted to abut diaphragm 78. A predetermined fuel pressure differential $P_1-P_2$ generated across the fuel-metering valve 41 is applied across fuel diaphragm 36 thereby loading ball valve 48 against valve seat 43 to prevent fuel flow therethrough which, in turn, causes the fuel pressure $P_2$ in chamber 38 to increase to pressure $P_1$ thereby eliminating the $P_1-P_2$ differential across diaphragm 36. The downstream side of closed ball valve 48 as well as the free end of rod 50 may be considered as exposed to ambient or atmospheric air pressure and may be neglected as far as any force differential compensation therebetween. The remaining net force unbalance acting to hold ball valve 48 against seat 43 is derived from the fuel pressure $P_1$ in chamber 38 acting against ball valve 48 over an area equivalent to the flow area of valve seat 43 plus any force imposed upon rod 50 by diaphragm 78 as a result of the heretofore-mentioned stretching effect thereof minus the fuel pressure $P_1$ in chamber 40 acting against the effective area of diaphragm 78 exposed thereto.

The mean effective area of diaphragm 78 is selected to equal the flow area of valve seat 43 such that the opposing forces derived from fuel pressure $P_1$ acting thereagainst cancel leaving only the force imposed by stretched diaphragm 78 effective in holding valve 48 against valve seat 43 which may be eliminated by suitable adjustment of sleeve 87. To that end, sleeve 87 is rotated causing the same as well as the lip portion 84 bearing thereagainst to advance axially along rod 50 toward seated ball valve 48 to eliminate the aforementioned stretched condition of diaphragm 78 and thus undesirable force unbalance imposed on rod 50. The lip portion 84 may be advanced in the above-mentioned manner until the ball valve 48 starts to move away from valve seat 43 to thereby indicate a reversal of force imposed on rod 50 by diaphragm 78 following which the sleeve 87 may be rotated in the opposite direction as necessary to lightly seat ball valve 48. Upon completing the above-described adjustment, the sleeve 87 is locked in position by inserting hexagonal retaining ring 92 between sleeve 86 and retaining member 62. The spacing member 102 with spring 101 interposed between flange 102 thereof and retaining member 92 is placed in position against retaining member 92 and secured by washer 98 and nut 100.

The compression spring 101 and compression spring 104 correspond to "constant head" and "constant effort" springs shown and described in the above-mentioned U.S. Pat. No. 3,114,359.

It will be recognized from the above-described structure that applicant's proposed fluid seal and adjustment means therefor is particularly adapted for use in control apparatus where an effective fluid seal must be utilized in a relatively inaccessible location with control structure requiring accurate calibration after assembly.

We claim:

1. An adjustable flexible fluid seal adapted to seal an opening through which a movable member extends for axial movement relative thereto, said fluid seal comprising:
    annular retaining means fixedly secured in said opening;
    an annular flexible member having a central aperture and a radially outermost portion operatively connected to said retaining means and retainer thereby;
    said movable member extending axially through said central aperture and having an interference fit therewith to provide frictional engagement between said flexible member and movable member; and
    adjustable means operatively connected to said movable member and engageable with the radially innermost portion of said flexible member to urge said radially innermost portion axially along said movable member to a predetermined desired position relative to said movable member to eliminate spring rate effect of said flexible member on said movable member.

2. An adjustable flexible fluid seal as claimed in claim 1 wherein:
    said annular retaining means includes an annular wall provided with a flange portion extending radially inwardly therefrom;
    an annular recess formed in said flange portion adapted to receive an annular lip formed on said radially outermost portion of said flexible member;
    a ring member fixedly secured in position in said annular wall and bearing against said lip to retain the same in said annular recess; and
    said annular wall being fixedly secured in said opening.

3. An adjustable flexible fluid seal as claimed in claim 2 wherein:
    said annular retaining means is formed from a heat-responsive plastic material;
    said annular wall being fixedly secured in said opening by a press fit; and
    said ring member and said annular wall being fused together to fixedly secure said ring member in position relative to said wall.

4. An adjustable flexible fluid seal as claimed in claim 1 wherein:
    said adjustable means includes a tubular member threaded internally and threadedly engaged with said movable member;
    said tubular member extending axially through said retaining means into engagement with said radially innermost portion of said flexible member; and
    locking means for retaining said tubular member in a desired position rotationally relative to said movable member.

5. An adjustable flexible fluid seal as claimed in claim 1 wherein the movable member is responsive to a variable control force and has a predetermined range of movement axially relative to the opening through which it extends and wherein:
    said adjustable means is operative to establish said predetermined desired position of said flexible member relative to said movable member to permit said flexible member to flex in an unstretched condition over the predetermined range of movement of said movable member attached thereto.

6. An adjustable flexible fluid seal as claimed in claim 4 wherein the movable member is an elongated rod connected to be actuated by a fluid pressure responsive member coaxial therewith and wherein:
    said tubular member is provided with a polygon-shaped exterior;
    said locking means includes a first retaining member fixedly secured to the fluid pressure responsive member and provided with a polygon-shaped recess having an opening through which the elongated rod and said tubular member secured thereto extends;
    a second retaining member slidably received by said polygon-shaped recess and provided with inner and outer polygon-shaped surfaces which mate with said exterior of said tubular member and said polygon-shaped recess, respectively, to retain said tubular member and said first retaining member in fixed relative positions;
annular spacing means slidably carried by said tubular member and adapted to abut said second retaining member; and
spring means interposed between said spring means and said second retaining member for urging the same apart.